Sept. 2, 1958            A. BORK            2,849,947
BREAD HOLDER FOR ELECTRIC TOASTERS
Filed March 20, 1957            2 Sheets-Sheet 1
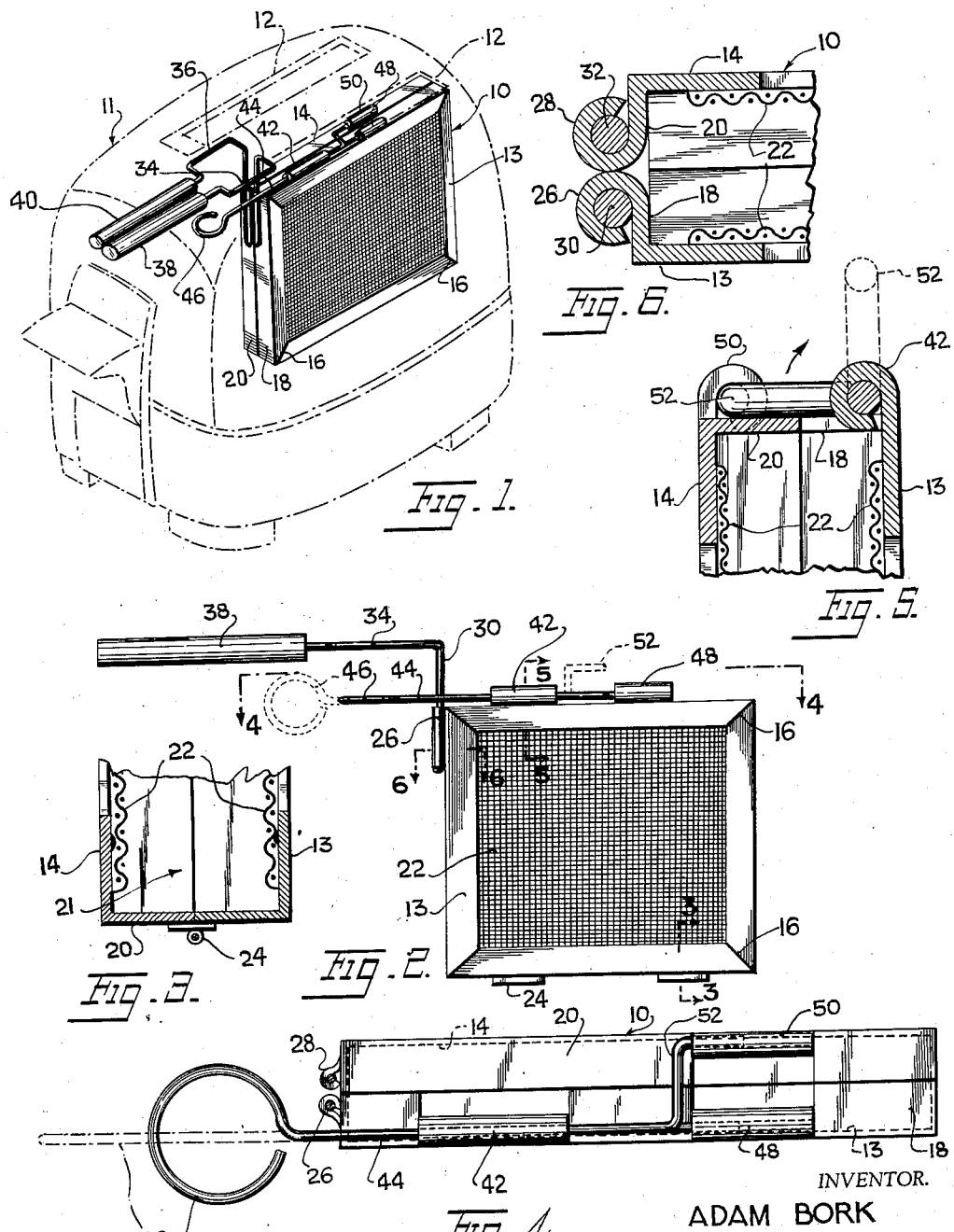
INVENTOR.
ADAM BORK
BY
ATTORNEY

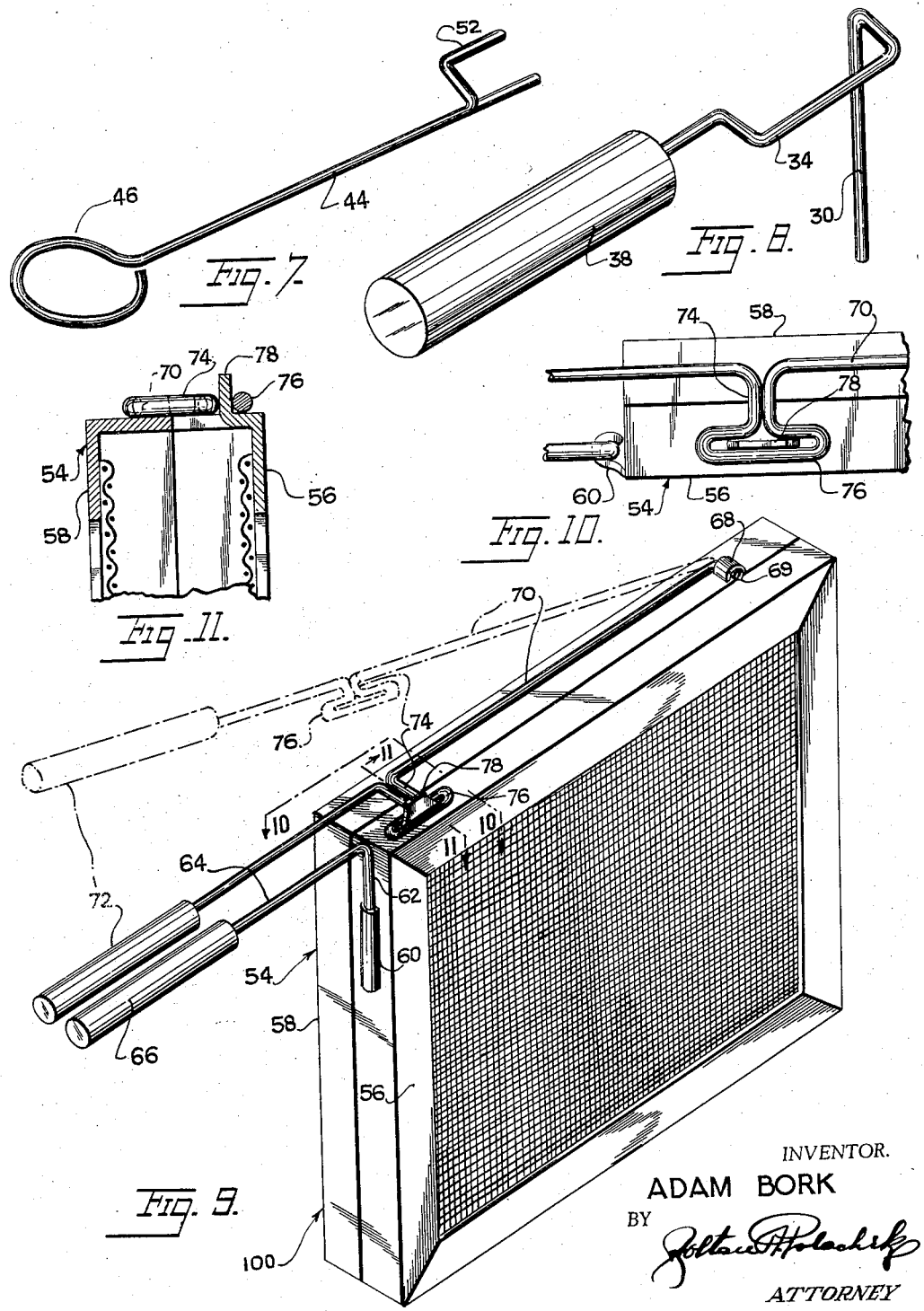

United States Patent Office 2,849,947
Patented Sept. 2, 1958

2,849,947

BREAD HOLDER FOR ELECTRIC TOASTERS

Adam Bork, Far Rockaway, N. Y.

Application March 20, 1957, Serial No. 647,249

2 Claims. (Cl. 99—402)

This invention relates to a device for holding a slice of toast in the toasting slot of an electric toaster, so that the slice may be inserted in or removed from the toaster without awaiting the automatically timed or manually effected operation of the usual ejecting mechanism.

One important object is to provide a toast holder that will fit readily into the toasting slot of any conventional toaster.

Another important object is to facilitate insertion of the slice in the holder, and also removal of the slice.

A further object is to include a novel latch means for holding the toast holder closed.

Yet another object is to prevent bread crumbs from falling out of the holder into the toast well of the toaster, except perhaps to a very minor extent.

Another object is to permit hot toast to be handled without discomfort.

Still another object is to provide a low cost, yet rugged holder.

A further object, in one form, is to incorporate the latch in a handle in a novel arrangement facilitating latching and unlatching of the hingedly connected sections of the device, with the handle being necessarily disposed in latching position whenever it is disposed for use as a handle in lifting the device.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of the toast holder, operatively positioned in a toaster illustrated in dotted lines.

Fig. 2 is a slightly enlarged side elevational view of the holder per se in which the dotted lines illustrate the unlatching position of the latch.

Fig. 3 is a greatly enlarged detail sectional view substantially on line 3—3 of Fig. 2.

Fig. 4 is a plan sectional view on a scale greater than that of Fig. 2, taken on line 4—4 of Fig. 2.

Fig. 5 is a detail sectional view on a scale greater than that of Fig. 4, on line 5—5 of Fig. 2, the dotted lines showing the latch in unlatching position.

Fig. 6 is a detail sectional view on line 6—6 of Fig. 2 on the same scale as Fig. 5.

Fig. 7 is an enlarged perspective view of the latch rod.

Fig. 8 is an enlarged perspective view of one of the handles.

Fig. 9 is an enlarged perspective view of a modified construction in which the dotted lines show a combined latch and handle in an unlatching position.

Fig. 10 is an enlarged, fragmentary, top plan view of the device of Fig. 9 as seen from the line 10—10 of Fig. 9.

Fig. 11 is an enlarged transverse section on line 11—11 of Fig. 9.

In Figs. 1–8, a toast holder 10 according to the invention is usable with a conventional automatic electric toaster 11 having the usual toast slots 12, in either of which the holder 10 may be bodily inserted while holding a bread slice, roll, muffin, or the like.

The holder 10 includes confronting, rectangular frames 13, 14 of heat-resistant material. Each frame is formed of a single sheet cut and bent to shape to include, in a preferred embodiment, mitered corners 16. Formed on the respective frames are peripheral flanges 18, 20, respectively. These extend toward each other and are in edge-contacting relation in the closed position of the device, so that the frames in effect are formed with recesses opening toward each other to provide a bread-slice-receiving chamber 21. Peripherally spot-soldered to frames 13, 14 are wire mesh screens 22 protectively enclosing the slice and preventing droppage of crumbs. One of the screens can be left off if desired.

The frames are hingedly connected at 24 to open and close at their tops. For holding the device, and opening and closing the same, handle means is provided. This includes vertical sleeves 26, 28 (Fig. 6) rolled out of the material of one end of the frames. The sleeves are crimped about the depending inner ends 30, 32, of handles 34, 36, having intermediate portions lying in a common horizontal plane (Fig. 1) and offset laterally outwardly from the sleeves 26, 28 and from hand grips 38, 40 provided at the outer ends of the handles.

Rolled out of the material of the top portion of frame 13 is a longitudinal, horizontal sleeve 42 in which is rotatable, and axially slidable, a latch rod 44 formed with an annular finger grip or handle 46 spaced downwardly from the handles 34, 36. Forwardly of sleeve 42, longitudinally extending, transversely aligned, sleeves 48, 50 are struck out of the material of the top portions of the respective frames. Sleeve 48 receives the forward extremity of the main or body portion of the rod, while sleeve 50 receives a laterally projecting, L-shaped extension or finger 52 of the rod.

In use, the device is swung to open or closed position by means of the handles 34, 36. When the frames are closed, rod 44 will initially be in the unlatching, dotted line position of Figs. 2, 4 and 5. Finger 52 extends upwardly and rod 44 is retracted in this position.

Then, to latch or lock the device in closed position, one first turns rod 44 counterclockwise, in Fig. 5, through ninety degrees to align the distal end of finger 52 with sleeve 50. Rod 44 is now shifted axially forwardly, to extend its front end and the distal end of finger 52 into sleeves 48, 50, respectively. This latches the frames in closed position.

The unlatching operation is, of course, merely the reverse of the latching action.

In the modified form of Figs. 9–11 the device 54 includes hingedly connected, wire-mesh-covered, rectangular, peripherally flanged frames 56, 58 generally like frames 13, 14. A sleeve 60 of frame 56 is crimped about the depending inner end 62 of a horizontally outwardly extending handle 64 to which is secured hand grip 66.

Struck out of frame 58 at the top thereof, adjacent the forward end of the frame, is a transverse sleeve 68 in which is rotatably engaged a lateral extension 69 formed on the front end of a combined latch and handle including a rod 70 terminating, at the end thereof remote from sleeve 68, in a hand grip 72, that extends in side-by-side relation to grip 66 in the operative position of the parts.

Intermediate its ends, rod 70 is formed with an integral, laterally projecting crimp 74 forming a latching finger. Crimp 74 terminates in a closed, longitudinally extending latching loop 76 adapted to receive an upwardly projecting lug 78 struck out of the material of frame 56.

Thus, when the frames have been swung to closed position, the rod 70 is swung downwardly from its dotted line position, causing lug 78 to be engaged in loop 76. This causes the frames to be latched as long as, and only when, the handles are in side-by-side, longitudinally contacting relation as in Fig. 9. Normal handling of the device with the handles so arranged will maintain the latching relation, that is, whenever the device is handled with both handgrips grasped in a natural manner, the frames will be held in a latched relationship.

If, however, handle 70, 72 is swung upwardly, the frames will be unlatched or disengaged and may now be swung to open position.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A toast holder comprising a pair of rectangular frames having recesses opening toward each other, means connecting the frames for movement between an open position in which access to the recesses is obtained, and a closed position in which the recesses form a chamber for an article being toasted, handle means carried by the respective frames, said handle means being offset from the plane of one edge and forming an extension thereof, and means on the frames for releasably latching the frames in closed position, the first means comprising a hinge connection extending at one edge of the frames, the last-named means being disposed at an opposite edge of the frame, the last-named means including a latch rod slidably and rotatably mounted on one frame and a sleeve on the other frame in which said rod engages responsive to rotation and sliding thereof in one direction, the rod being formed with a laterally offset finger constituting the part of the rod engaging in the sleeve, the other frame including a sleeve receiving a main portion of the rod when the finger is engaged in the first sleeve.

2. A toast holder comprising a pair of rectangular frames having recesses opening toward each other, means connecting the frames for movement between an open position in which access to the recesses is obtained, and a closed position in which the recesses form a chamber for an article being toasted, handle means carried by the respective frames, said handle means being offset from the plane of one edge and forming an extension thereof, and means on the frames for releasably latching the frames in closed position, the first means comprising a hinge connection extending at one edge of the frames, the last-named means being disposed at an opposite edge of the frame, the last-named means including a latch rod slidably and rotatably mounted on one frame and a sleeve on the other frame in which said rod engages responsive to rotation and sliding thereof in one direction, the rod being formed with a laterally offset finger constituting the part of the rod engaging in the sleeve, the other frame including a pair of spaced sleeves receiving a main portion of the rod when the finger is engaged in the first sleeve, said first sleeve and one of the pair of sleeves being aligned transversely of the frames.

References Cited in the file of this patent

UNITED STATES PATENTS

| | | |
|---|---|---|
| 223,624 | De Witt | Jan. 13, 1880 |
| 534,255 | Fleming | Feb. 19, 1895 |
| 695,096 | Faivre | Mar. 11, 1902 |
| 1,659,822 | Innes | Feb. 21, 1928 |
| 1,706,516 | Bennett | Mar. 26, 1929 |
| 1,807,220 | Leberman | May 26, 1931 |
| 1,903,324 | Codling | Apr. 4, 1933 |